Patented Mar. 21, 1933

1,902,103

UNITED STATES PATENT OFFICE

FRITZ SCHÖNHÖFER, OF ELBERFELD, GERMANY, ASSIGNOR TO WINTHROP CHEMICAL COMPANY, INC., OF NEW YORK, N. Y., A CORPORATION OF NEW YORK

MANUFACTURE OF QUINOLINE DERIVATIVES AND THE PRODUCTS

No Drawing. Application filed December 12, 1928, Serial No. 325,662, and in Germany December 17, 1927.

The present invention relates to new products of the quinoline series and to a process of preparing same.

In accordance with the invention an o-aminobenzaldehyde or o-aminophenylketone, such as o-aminobenzaldehyde, o-aminoacetophenone, o-aminopropiophenone, 2-amino-3-methylbenzaldehyde, 6-amino-2.4-5-trimethylbenzaldehyde, 4-chloro-2-aminobenzaldehyde, 5-methoxy-2-aminobenzaldehyde and the like, are caused to react with such an aminoketone, as contains at least one of the groups $CH_3$ and $CH_2$ linked to the carbonyl-group and at least one substituted or unsubstituted amino-group linked to the aliphatic chain. The mechanism of the reaction will probably be as follows:

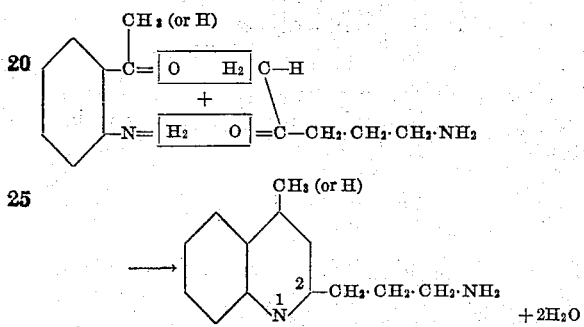

As aminoketones of the kind above referred to may be mentioned by way of example:

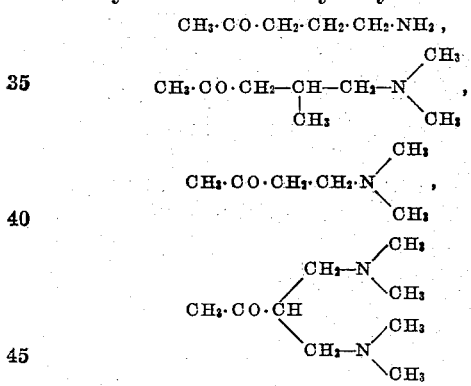

and the like.

The reaction can be performed in various manners. For instance, the reaction components can be molten together at a temperature of about 100–130° C.; or the reaction is caused to take place in the presence of water or of a neutral or basic reacting indifferent organic solvent, such as alcohols, benzene, toluenes, pyridine and the like, the reaction occurring already at room temperature, but being accelerated in the most cases by higher temperatures up to the boiling point of the reaction mixture.

Often, especially when working with a not basic reacting solvent, it will be of advantage, to add to the reaction mixture a small amount of a catalytically acting basic substance, such as pyridine, dimethylamine, trimethylamine, caustic soda lye and the like, about $\tfrac{1}{10} - \tfrac{2}{10}$ gr. of these substances for 100 gr. of the reaction mixture being generally sufficient to energically accelerate the reaction.

The compounds thus obtainable form oily or solid colorless or weakly colored products, easily soluble in the usual organic solvents, and of strong basic properties and bitter taste. They form well crystallized white salts with mineral acids, for example, hydrochloric acid, and yellow chromates, when treated with chromic acid in acetic acid (except those as contain free aminogroups, which latter will be attacked by chromic acid). When dissolved in diluted mineral acid, they are not precipitated by the addition of sodium acetate. The compounds are intended to be used either in the form of the free bases, or in the form of their salts or other derivatives, for pharmaceutical purposes; especially those which correspond to the probable general formula:

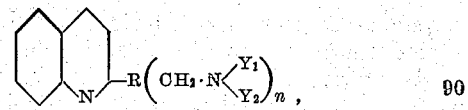

wherein R stands for one of the groups consisting of saturated aliphatic straight chains and saturated aliphatic branched chains, $Y_1$ and $Y_2$ stand for hydrogen or alkyl and $n$ stands for one of the numbers 1 and 2, and wherein the quinoline nucleus may be further substituted by monovalent substituents. Also these compounds mainly exert the properties mentioned above broadly.

The following examples illustrate my invention without limiting it thereto, the parts being by weight:

*Example 1.*—151 parts of 5-methoxy-o-aminobenzaldehyde are dissolved in 20,000 parts of water, 157 parts of diethyl-amino-4-pentanone are added and the solution is left to stand for 7 days at ordinary temperature. The base is then salted out with potassium carbonate and the whole is repeatedly extracted with ether. The ethereal solution is shaken up with dilute hydrochloric acid. The acid aqueous solution is then made neutral to Congo red by means of sodium acetate solution and is extracted with ether three times. The aqueous solution is then rendered alkaline with potassium carbonate and caustic soda lye and distilled with steam for a short time. The oil remaining in the distillation vessel is dissolved in ether and the ethereal solution is dried with potassium carbonate. The ether is evaporated and the remaining oil is fractionated.

The base, thus obtained, boils at 180–184° C. under 2.5 mm. pressure. It is a colorless oil and with ethereal hydrochloric acid forms a white hydrochloride, which is readily soluble in water.

On treatment with potassium bichromate in acetic acid solution the base yields a yellow crystalline chromate, which is soluble in water with difficulty. The base probably corresponds in its free form to the formula:

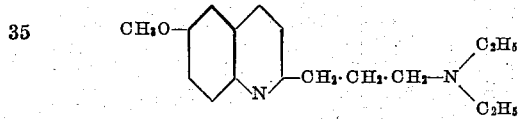

*Example 2.*—121 parts of o-aminobenzaldehyde are dissolved in 500 parts of absolute alcohol and heated for several days at 60–80° C. with 157 parts of diethylamino-4-pentanone and 5 drops of diethyl amine. The alcohol is then distilled off, and the oil remaining in the distillation vessel is dissolved in dilute hydrochloric acid. The further working up is carried out as in Example 1. The resulting base forms an oil, boiling at about 160–162° C. at a pressure of 2 mm.

*Example 3.*—7 parts of o-aminoacetophenone are boiled, while stirring, with 1000 parts of water and 8 parts of diethylaminopentanone. After the reaction has finished, the new product can be isolated as described in Example 1. It represents a colorless oil having the boiling point 145–150° C. at a pressure of 1.5–2 mm.

*Example 4.*—121 parts of o-aminobenzaldehyde are dissolved in 30 cc. of ethylalcohol and a solution of 11.5 parts of the compound

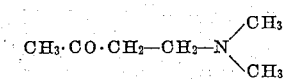

in 3000 parts of water is caused to run in while stirring. The solution is allowed to stand for about 8 days at room temperature and further worked up as described in Example 1. There is obtained a colorless oil, boiling at about 119–120° C. at a pressure of about 2 mm. After cooling and standing for a longer time, the oil solidifies to white crystals, melting at about 55–56° C.

*Example 5.*—In an analogous manner as described in Example 1 the compound of the probable formula:

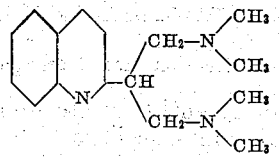

is obtainable from one mol of o-aminobenzaldehyde and one mol of the compound

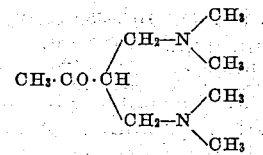

It forms a colorless oil, boiling at about 130–135° C. at a pressure of 2 mm.

*Example 6.*—In an analogous manner the compound of the probable formula:

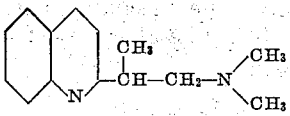

is obtainable by reacting upon one mol of o-aminobenzaldehyde with 1 mol of the ketone

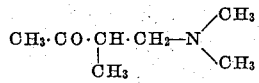

The new compound forms a nearly colorless oil of the boiling point 106–108° C. at a pressure of about 1.8 mm. When strongly cooling, the oil solidifies to white crystals melting again at about 73° C. This compound as well as those mentioned in the former examples form on treatment with chromic acid/acetic acid yellow chromates difficultly soluble in water, and with hydrochloric acid hydrochlorides, easily soluble in water.

I claim:—

1. Process which comprises reacting upon a compound of the general formula:

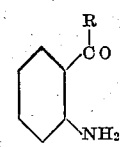

in which R stands for hydrogen or alkyl and the nucleus of which may be substituted by monovalent substituents of the group consisting of alkyl, alkoxy and halogen, with such a ketone as contains at least one of the groups —CH₃ and —CH₂— linked to the carbonyl group, and at least one substituted or unsubstituted amino group linked to an aliphatic chain.

2. Process which comprises reacting upon a compound of the general formula:

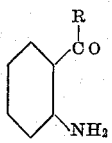

in which R stands for hydrogen or alkyl and the nucleus of which may be substituted by monovalent substituents of the group consisting of alkyl, alkoxy and halogen, with such a ketone as contains at least one of the groups —CH₃ and —CH₂— linked to the carbonyl group, and at least one substituted or unsubstituted amino group linked to an aliphatic chain, in the presence of a suitable neutrally or basically reacting inert solvent.

3. Process which comprises reacting upon a compound of the general formula:

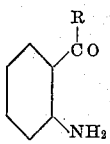

in which R stands for hydrogen or alkyl and the nucleus of which may be substituted by monovalent substituents of the group consisting of alkyl, alkoxy and halogen, with such a ketone as contains at least one of the groups —CH₃ and —CH₂— linked to the carbonyl group, and at least one substituted or unsubstituted amino group linked to an aliphatic chain, in the presence of a suitable neutrally or basically reacting inert solvent, with the addition of a small amount of a catalytically acting basic substance.

4. Process which comprises reacting upon a compound of the general formula:

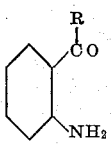

in which R stands for hydrogen or alkyl and the nucleus of which may be substituted by monovalent substituents of the group consisting of alkyl, alkoxy and halogen, with such a ketone as contains at least one of the groups —CH₃ and —CH₂— linked to the carbonyl group, and at least one substituted or unsubstituted amino group linked to an aliphatic chain, in the presence of water.

5. Process which comprises reacting upon 151 parts by weight of 5-methoxy-ortho-amino-benzaldehyde with 157 parts by weight of diethylamino-4-pentanone in the presence of 20,000 parts by weight of water at ordinary temperature for about 7 days, then salting out the base with potassium carbonate, extracting with ether, shaking up the ethereal solution with diluted hydrochloric acid, neutralizing the aqueous solution obtained with sodium acetate, extracting it with ether, distilling with steam for a short time, taking up the remaining oil with ether, evaporating the ether and fractionating the remainder.

6. The products of the probable formula:

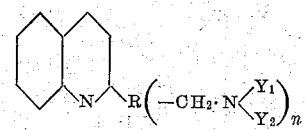

wherein R stands for one of the groups consisting of saturated aliphatic straight chains and saturated aliphatic branched chains, Y₁ and Y₂ stand for hydrogen or alkyl and n stands for one of the numbers 1 and 2, and wherein the quinoline nucleus may be further substituted by monovalent substituents of the group consisting of alkyl, alkoxy and halogen, said products being colorless to weakly colored compounds of strong basic properties and bitter taste, yielding with chromic acid/acetic acid yellow chromates, water-soluble hydrochlorides with hydrochloric acid, and being not precipitated by sodium acetate from their solutions in mineral acids.

7. The product of the probable formula:—

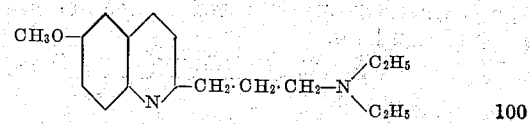

said product being a colorless oil, boiling at about 180–184° C. under 2.5 mm. pressure, forming with ethereal hydrochloric acid a white hydrochloride, easily soluble in water, and with bichromate in acetic acid solution a yellow crystalline chromate, which is soluble in water with difficulty.

8. The process which comprises reacting upon one mol of o-aminobenzaldehyde with one mol of the compound of the formula:

in the presence of water at ordinary temperature during about 7 days, then salting out the base with potassium carbonate, extracting with ether, shaking up the ethereal solution with diluted hydrochloric acid, neutralizing the aqueous solution obtained with sodium acetate, extracting it with ether, distilling with steam for a short time, taking up the remaining oil with ether, evaporating the ether and fractionating the remainder.

9. The process which comprises reacting upon one mol of o-aminobenzaldehyde with one mol of the ketone of the formula:

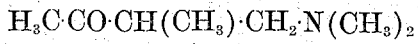

in the presence of water at ordinary temperature during about 7 days, then salting out the base with potassium carbonate, extracting with ether, shaking up the ethereal solution with diluted hydrochloric acid, neutralizing the aqueous solution obtained with sodium acetate, extracting it with ether, distilling with steam for a short time, taking up the remaining oil with ether, evaporating the ether and fractionating the remainder.

10. The product of the probable formula:

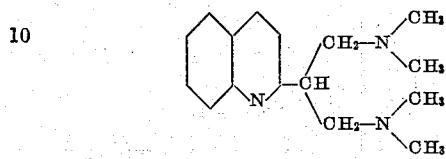

said product being a colorless oil boiling under 2 mm. pressure at about 130–135° C.

11. The product of the probable formula:

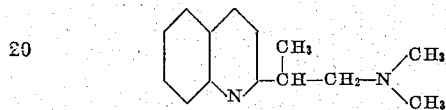

said product being a nearly colorless oil, boiling under about 1.8 mm. pressure at 106–108° C., solidifying on strongly cooling to white crystals melting at about 73° C., forming on treatment with chromic acid/acetic acid a yellow chromate difficultly soluble in water and with hydrochloric acid a hydrochloride easily soluble in water.

In testimony whereof I have hereunto set my hand.

FRITZ SCHÖNHÖFER. [L. S.]